United States Patent [19]
Hamada et al.

[11] Patent Number: 4,764,787
[45] Date of Patent: Aug. 16, 1988

[54] AUTOMATIC FOCUS ADJUSTING DEVICE

[75] Inventors: Masataka Hamada, Minamikawachi; Tokuji Ishida, Daito, both of Japan

[73] Assignee: Minolta Camera Kabushiki Kaisha, Osaka, Japan

[21] Appl. No.: 5,674

[22] Filed: Jan. 21, 1987

[30] Foreign Application Priority Data

Jan. 21, 1986 [JP] Japan ................................. 61-11538

[51] Int. Cl.$^4$ ................................................ G03B 3/00
[52] U.S. Cl. ........................................................ 354/408
[58] Field of Search ....................... 354/402, 406–408; 250/201 PF, 204

[56] References Cited

U.S. PATENT DOCUMENTS 4,387,975  6/1983  Araki .............................. 354/408 X
4,445,761  5/1984  Ishikawa et al. ..................... 354/402
4,671,640  6/1987  Akada et al. ........................ 354/402

FOREIGN PATENT DOCUMENTS 156028  8/1985  Japan ................................... 354/400

Primary Examiner—W. B. Perkey
Attorney, Agent, or Firm—Burns, Doane Swecker & Mathis

[57] ABSTRACT

An automatic focus adjusting device for a camera is disclosed. The automatic focus adjusting device has lens control means for driving an objective lens at a high speed while repeating focus condition detecting operation when a defocus amount detected is large and, when the defocus amount becomes small, at a low speed without executing the focus condition detecting operation in order to stop the objective lens at an in-focus position thereof.

15 Claims, 9 Drawing Sheets

AUTOMATIC FOCUS ADJUSTING DEVICE

BACKGROUND OF THE INVENTION

1. Field of the Invention

The present invention relates to an automatic focus adjusting device which detects a focus condition of an objective lens of a camera by receiving a light form an object passed through an objective lens and drives the objective lens based upon the focus condition detected.

2. Description of the Prior Art

There has been known a focus condition detecting device in which two object images are formed by reimaging two object light bundles having been passed through a first and second areas of an objective lens being symmetric to each other with respect to the optical axis 18 thereof, a positional relationship between these two object images is calculated based upon correlation calculation thereabout, and then, focus condition data such as a defocus amount of the detected focus position from a predetermined focus position i.e., an in-focus position, and the direction of the defocus are obtained.

A typical optical system for the focus condition detecting device of this type is shown in FIG. 1.

As shown in FIG. 1, this optical system includes a condenser lens 6 being arranged on the predetermined focal plane 4 set behind the objective lens 2 equivalent to a film sequence of a camera or on a plane behind the predetermined focal plane 4 and two reimaging lenses 8 and 10 being arranged rearside of the condenser lens 6 and, there are arranged two image sensors 12 and 14 on respective focal planes of the reimaging lenses 8 and 10. Each of these image sensors is constituted by a charge integration or light intergration type photo detecting device such as a CCD (charge coupled device).

As shown in FIG. 2 schematically, two object images reimaged on the image sensors are approached to each other with respect to the optical axis 18 of the objective lens 2, if an object image is formed front side of the predetermined focal plane 4, and are apart from each other with respect to the optical axis 18 if the object image is formed rearside thereof. If the object image is formed just on the predetermined focal plane 4, a distance between two corresponding points of the reimaged two object images becomes equal to a specific value which is determined by the composition of the optical system. Accordingly, the focus condition can be obtained, in principle, by detecting a distance between two corresponding points of the reimaged two object images.

In an automatic focus adjusting device of a camera installing such an optical system for detecting a focus condition as mentioned above, a control circuit constituted by a micro-computer is provided for controlling a series of sequence of integration of light amount of an object image by each CCD image sensor, detection and calculation of a focus condition with use of outputs of the image sensor (calculation of defocus amount), driving operation of the objective lens based upon the defocus amount detected and stopping the objective lens at an in-focus position thereof (if a shutter release button is pushed down for a shutter release).

The automatic focus adjusting device repeats the abovementioned automatic focus adjusting sequence, even when the objective lens is moved close to an in-focus position thereof, in order to set the objective lens at an in-focus position accurately.

In JP-A Nos. 78823/1981 or 156028/1985, there is disclosed a focus condition detecting system wherein focus condition detecting operations are carried out even when the objective lens is moving in order to enhance the accuracy in the focus condition detection.

Meanwhile, in the automatic focus adjusting device, after a defocus amount is obtained by one focus condition detecting operation in the case that an object is approaching to the camera or aparting therefrom, and if the objective lens is moved to the in-focus position determined according to the defocus amount obtained, the focus condition of the objective lens adjusted has become inaccurate, since the object has been moved during the focus adjustment.

Accordingly, it is desirable to shorten calculation time needed for the calculation of defocus amount as short as possible in order to obtain an exact in-focus condition even in the case that an object is moving.

Conventionally, an in-focus position is determined in such a manner that a lens driving amount being measured from the center point of an integration to finishment of a focus condition detecting operation is compared with a defocus amount detected and the objective lens is stopped at the timing that the former becomes equal to the latter.

However, in this method, since the center point of an integration has to be determined as a point at which an amount of integrated charge becomes equal to one-half of a predetermined value, the constitution of the focus condition detecting circuit becomes complex and this invites a higher cost.

SUMMARY OF THE INVENTION

An essential object of the present invention is to provide an automatic focus adjusting device for a camera which is able to shorten time necessary for positioning an objective lens at an in-focus position thereof as short as possible.

In order to accomplish this object, the present invention provides an automatic focus adjusting device comprising an objective lens, photo-receiving means of charge integration type for receiving a light from an object having passed through the objective lens, integration time control means for controlling charge integration time for the photo-receiving means according to the intensity of light incident thereon, focus condition detecting means for detecting a defocus amount of the objective lens from an in-focus position thereof based on the outputs of the photo-receiving means, focus condition detection control means for controlling the integration operation of the photo-receiving means and the detection operation of the focus condition detecting means so as to repeat these operations successively, lens drive means for driving the objective lens to an in-focus position, movement detecting means for detecting an amount of movement of the objective lens driven by the lens drive means, movement calculation means for calculating an amount of movement of the objective lens from a specific timing during the integration by the photo-receiving means to a completion timing of the focus condition detecting operation according to the output of the movement detecting means while the integration operation by the photo-receiving means and the detecting operation by the focus condition detection means are repeated while driving the objective lens, decision means for deciding whether the defocus amount detected falls within a predetermined range including an in-focus position or not, and lens control means for controlling the lens drive means based on the output of the movement detecting means and the result of decision by the decision means, said control means repeating the integration operation by the photo-receiving means and the detection operation by the focus condition detection means while controlling the lens drive means so as to drive the objective lens at a high and constant speed when the defocus amount detected is out of the predetermined range, and controlling the lens drive means so as to drive the objective lens at a low speed when the defocus amount detected falls in the predetermined range and to stop it when a remaining driving amount determined by a difference between a necessary driving amount corresponding to a defocus amount detected and an amount of movement calculated by the movement calculation means comes into a predetermined relation with respect to an amount of movement detected by the movement detection means.

According to the present invention, the defocus amount is detected repeatedly while driving the objective lens at a high and constant speed when the defocus amount detected is out of a predetermined zone.

On the contrary to the above, when the defocus amount comes into the predetermined zone (near zone), the focus condition detection is suspended and the objective lens is driven at a low speed by a remaining driving amount which is obtained by subtracting an amount corresponding to a time needed for the latest focus condition detection from the defocus amount obtained thereby.

According to the present invention, therefore, the automatic focus adjustment is made fast.

BRIEF DESCRIPTION OF THE DRAWING

Other features and advantages of the present invention will be apparent from the following description taken in connection with the accompanying drawings in which.

DESCRIPTION OF THE PREFERRED EMBODIMENT

Preferred embodiments will be explained in the order of following items;
 (a) System Composition of the Automatic Focus Adjusting Device
 (b) Control System for the Automatic Focus Adjustment
 (c) Calculation for Defocus Amount
 (d) Flow-Chart for the Automatic Focus Adjustment

(a) System Composition of the Automatic Focus Adjusting Device

Figure 5:
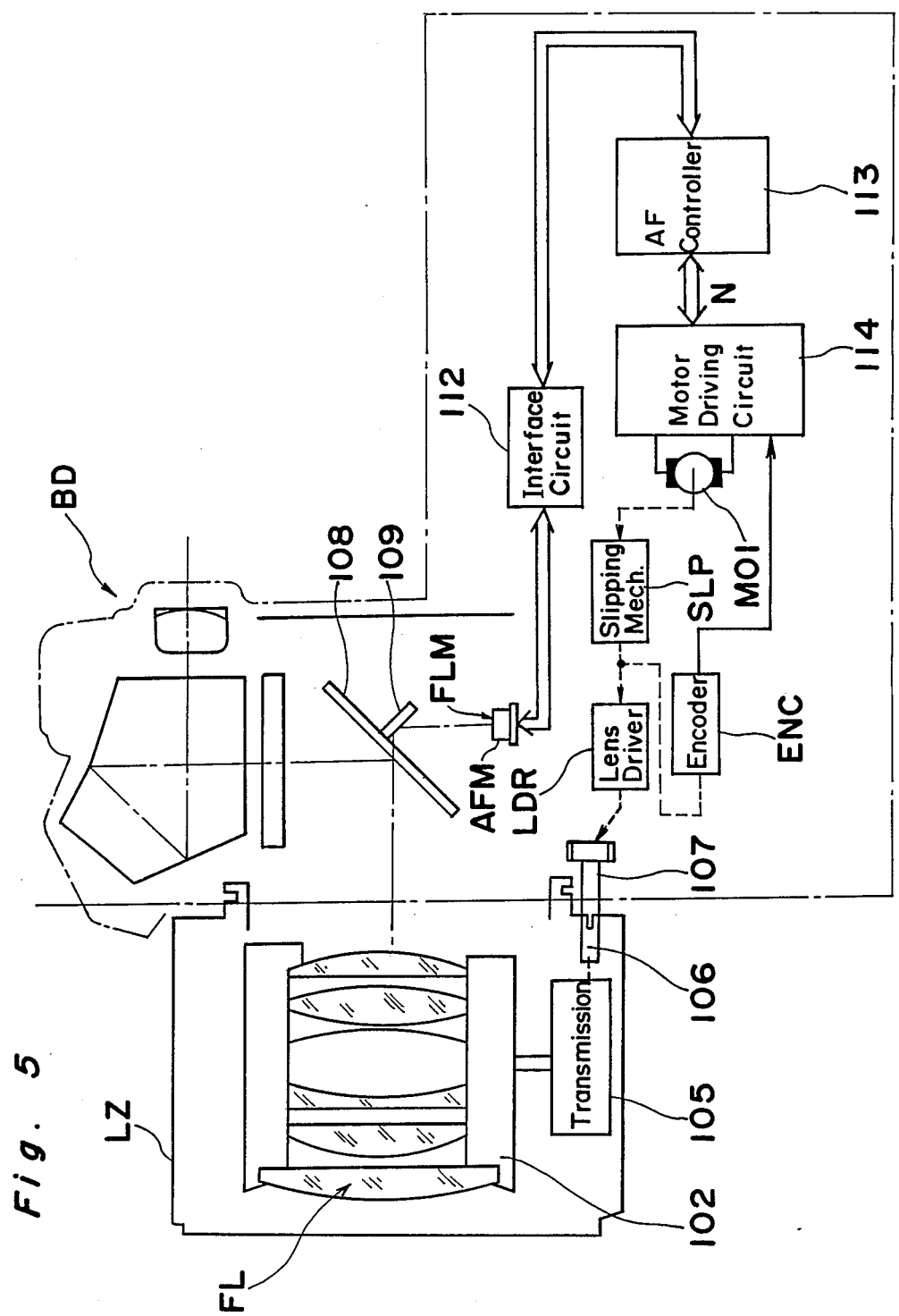
FIG. 5 is a block diagram showing a system of camera for the automatic focus adjustment according to the present invention.

FIG. 5 shows a block diagram of a camera including an automatic focus adjusting device according to the present invention.

As shown schematically in FIG. 5, the camera is essentially comprised of a main body BD and an interchangeable objective lens LZ being mounted to the main body BD. The objective lens LZ is connected, via clutch members 106 and 107, to drive means provided in the main body BD.

In this camera system, an optical system for detecting a focus condition of the objective lens is provided, wherein a light from an object having passed through the objective lens LZ passes through a half-mirror portion provided at a center area of a reflex mirror 108 at first and, then, is reflected by a sub-mirror 109 and is received by a CCD image sensor FLM installed in a focus condition detection module AFM.

An interface circuit 112 is provided for driving the CCD image sensor FLM, for reading object image data detected by the CCD image sensor FLM and for transmitting said object image data to an automatic focus controller 113. This automatic focus controller 113 calculates a defocus amount $|\Delta L|$ indicating a deviation from an in-focus position of the objective lens LZ and a defocus direction indicating a front or rear focus condition based on the object image data given from the CCD image sensor FLM.

A motor MO1 is driven by a motor driving circuit 114 according to control signals outputted from the automatic focus controller 113 and the driving force by the motor MO1 is transmitted, via a slipping mechanism SLP, a lens driving mechanism LDR and the clutch member 107 of the main body BD, to the clutch member 106 of the objective lens LZ. The slipping mechanism SLP is provided for avoiding over load onto motor MO1 by slipping when a torque applied thereon is larger than a predetermined value.

The clutch member 106 for the objective lens LZ is connected to a transmission member 105 and a focusing lens FL of the objective lens LZ is moved, via the transmission means 105 and a focus adjusting member 102, in the direction of the optical axis of the objective lens to position the same at an in-focus position. Further, there is provided an encoder ENC for monitoring a driving amount of the motor MO1 which is connected to the driving mechanism LDR of the main body BD and outputs a number of pulses corresponding to a driving amount of the motor MO1.

Now, assuming the number of revolution of the motor MO1 to NM, the number of pulses outputted by the encoder ENC to N, the resolution of the encoder ENC to $\rho$ (1/rev.), the deceleration ratio of transmission mechanisms including from the driving shaft of the motor MO1 till the mounting shaft of the encoder ENC to μ P, the deceleration ratio of transmission mechanisms including from the driving shaft of the motor MO1 till the clutch member 107 of the main body BD to μ B, the deceleration ratio of transmission mechanisms including from the clutch member 106 of the objective lens till the focus adjusting member 102 to μ L, the lead of hericoid of the focus adjusting member 102 to LH (mm/rev.) and the amount of movement of the focusing lens FL of the objective lens to Δ d (mm), following equations are obtained:

$$N = \rho \cdot \mu P \cdot NM$$

$$\Delta d = NM \cdot \mu B \cdot \mu L \cdot LH.$$

Namely, next equation is obtained from these equations.

$$\Delta d = N \cdot \mu B \cdot \mu L \cdot LH / (\rho \cdot \mu P) \tag{1}$$

Further, defining a ratio of Δ d with an amount of movement Δ L (mm) of a focusing plane obtained when the objective lens is moved by Δ d as $$Kop = \Delta d / \Delta L \tag{2}$$

next equation is obtained from equations (1) and (2).

$$N = Kop \cdot \Delta L \cdot \rho \cdot \mu P / (\mu B \cdot \mu L \cdot LH) \tag{3}$$

Now, defining following equations, $$KL = Kop / (\mu L \cdot LH) \tag{4}$$

$$KB = \rho \cdot \mu P / \mu B \tag{5}$$

next equation is obtained.

$$N = KB \cdot KL \cdot \Delta L \tag{6}$$

In the equation (6), Δ L is determined from the absolute value thereof |Δ L| and the defocus direction given by the automatic focus controller 113.

Further, KB in the equation (5) is determined as a constant data fixed according to the deceleration ratio μ B and is memorized in the automatic focus controller 113. The automatic focus controller 113 calculates a defocus amount |Δ L| with use of object image data transmitted from the interface circuit 112 and then the number of pulses N to be detected by the encoder ENC is calculated from an equation $$K \cdot |\Delta L| = N$$

with use of |Δ L| and an equation $KL \cdot KB = K$.

The automatic focus controller 113 drives the motor MO1 via the motor driving circuit 114 in the clockwise or counter-clock-wise direction according to the defocus direction and stops the motor MO1 when the number of pulses equal to N calculated by the focus condition detection has been outputted from the encorder ENC since this means that the focusing lens FL of the objective lens LZ is moved by the amount of movement Δ d so as to position it at an in-focus position.

The calculation method of the value K is not limited to that mentioned above wherein the data KB memorized in the automatic focus controller 113 is multiplied by data KL determined from the composition of objective lens.

Although the system of the automatic focus adjusting device is shown as a combination of many blocks in order for aid of understanding the system in FIG. 5, almost all of functions to be performed in this system are executed by a micro-computer as will be explained hereinafter.

Figure 4:
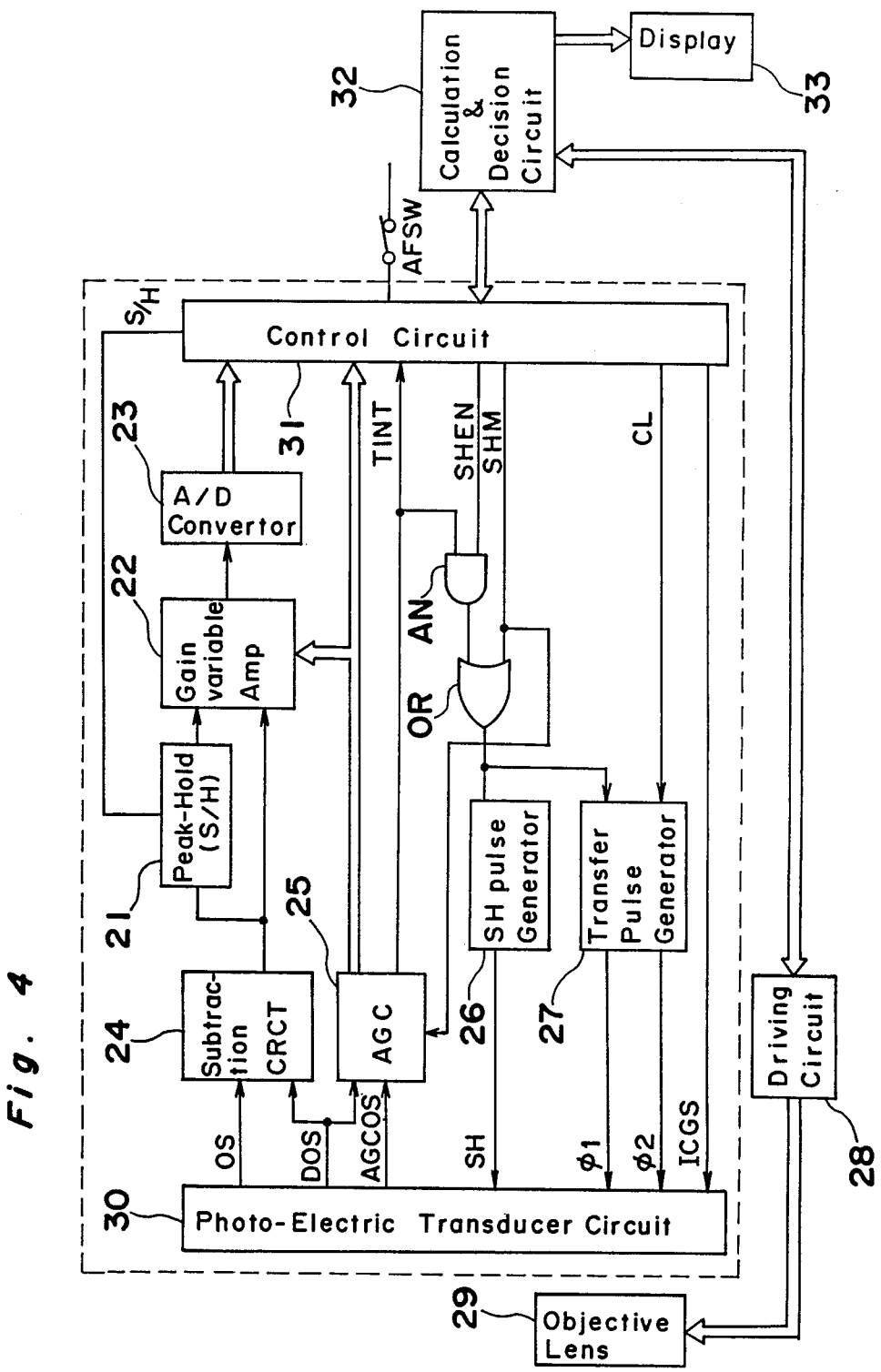
FIG. 4 is a block diagram showing an automatic focus adjusting circuit according to the present invention.

FIG. 4 shows a block diagram of the automatic focus adjusting circuit according to the present invention.

A control circuit 31 being comprised of a microcomputer starts to detect a focus condition when a shutter-release button (not shown) is pushed down by a half stroke during a switch AFSW for automatic focus adjustment is switched ON.

At first an integral-clear pulse signal ICGS is outputted to a photo-electric transducer circuit 30. The photo-electric transducer circuit 30 includes a CCD (charge coupled device) image sensor as first and second photo-electric transducer arrays (See FIG. 8). When the integral-clear signal ICGS is applied to the photo-electric transducer circuit 30, all sensing elements of the CCD image sensor are reset to their initial states and the output AGCOS of brightness monitoring circuit (not shown) installed in the CCD image sensor is raised to a level near to that of a voltage source.

At the same time, the control circuit 31 outputs a signal SHEN of "High" level for allowing generation of a shift-pulse.

When the integral clear signal ICGS disappeares, an integration for a photo-current is started in each element of CCD image sensor of the photo-electric transducer circuit 30 and the output AGCOS of the brightness monitoring circuit is lowered at a velocity corresponding to the brightness of an object while the output DOS of a standard signal generating circuit (not shown) installed in the photo-electric transducer circuit 30 is kept at a constant standard level.

An auto-gain control circuit 25 compares the output AGCOS with the standard output DOS to obtain a degree how the output AGCOS is dropped against the output DOS within a predetermined time interval (for example 100 msec.) and controls the gain of a differential amplifier 22 of a gain variable type according to the degree detected. Also, the gain control circuit 25 outputs a signal TINT of "High" level at the time when the output AGCOS is dropped by a predetermined level or more within the predetermined time interval after the drop of the signal ICGS. The signal TINT is input, via an AND gate AN and an OR gate OR, into a shift pulse generating circuit 26 and the shift pulse generating circuit 26 outputs a shift pulse SH upon receiving the signal TINT. At the time that the shift pulse SH is input into the photo-electric transducer circuit 30, the integration of photo-current by each sensing element of the CCD image sensor is ceased and electric charges each corresponding to an integrated value are transmitted parallel from the sensing elements of the CCD image sensor to corresponding cells of a shift register (not shown) installed in the photo-electric transducer circuit 30.

Meanwhile, a transfer pulse generating circuit 27 responsive to clock pulses outputted from the control circuit 31, generates two kinds of sensor driving pulses $\phi_1$ and $\phi_2$ having phases different from each other by $\pi$ radian. These sensor driving pulses $\phi_1$ and $\phi_2$ are applied to the photo-electric transducer circuit 30. The CCD image sensor of the photo-electric transducer circuit 30 discharges the charge of each element of the CCD shift register one by one from one end thereof in a manner synchronized with the timing of rise of the pulse $\phi_1$. Each charge signal OS representing an image signal is input into a subtraction circuit 24. The signal OS has a higher voltage as the intensity of incident light into the corresponding element becomes lower. The subtraction circuit 24 subtracts the OS signal from the standard signal DOS and outputs the subtracted signal (DOS-OS) as a picture element signal.

If the predetermined time is elasped over with no signal TINT to be outputted from the auto-gain controller 25 after the disappearance of the integration clear signal ICGS, the control circuit 31 outputs an instruction signal SHM for generating the shift pulse in place of the signal TINT. Corresponding to this instruction signal SHM, the shift pulse generating circuit 26 generates a shift pulse SH.

The control circuit 31 outputs a sample-hold signal S/H when element signals corresponding to elements from seventh to tenth are outputted from the photoelectric transducer circuit 30. These elements of the CCD image sensor are covered with an aluminium mask for the purpose to remove dark current components included in the image signal and, therefore, are shuttered off against the incident light. A peak-hold circuit 21 holds the difference between the output DOS and the output OS corresponding to the masked portion of the CCD image sensor and, thereafter, this differential signal and the element signal are input into the gain variable amplifier 22. The gain variable amplifier 22 amplifies a difference between the element signal and the differential signal with a gain controlled by the auto gain-controller 25. The amplified output thereof is converted into digital data by an analogue-digital conventor 23 and, then, the converted digital data is input into the control circuit 31 as an image signal data.

The A/D conversion by the A/D converter 23 is done in a unit of eight bits but data of top four bits and data of bottom four bits are separately transmitted to the control circuit 31.

Thereafter, the control circuit 31 stores the image signal data in the internal memory thereof. When the control circuit 31 has completed to memorize all image signal data, it gives all memorized data to a calculation & decision circuit 32. The calculation & decision circuit 32 calculates an amount of defocus and a direction thereof according to predetermined programs provided therefor. The circuit 32 drives a lens driving circuit 28 according to the amount of defocus and the direction thereof in order for the automatic focusing adjustment of an objective lens 29 and also controls a display circuit 33 so as to display these data.

(b) Control for Automatic focus adjustment

Figure 1:
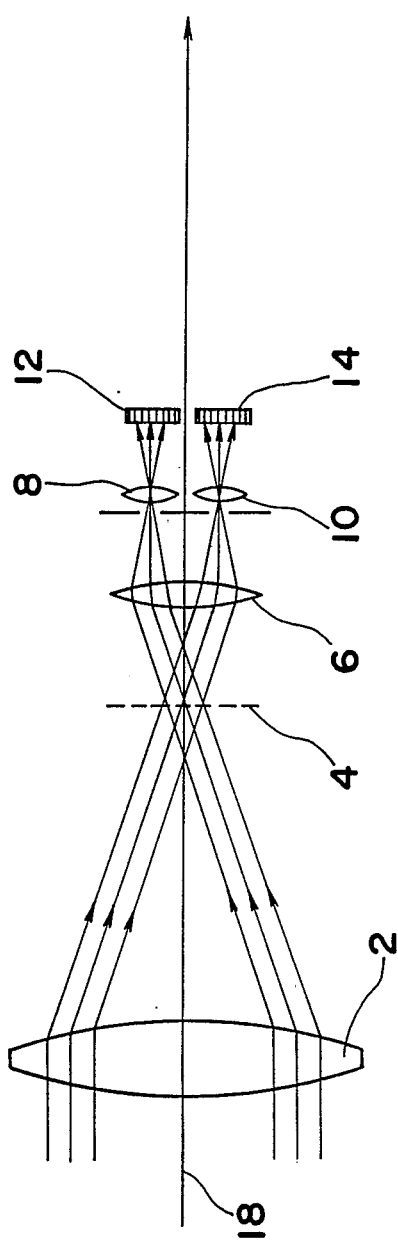
FIG. 1 is an explanative view showing an optical system for focus condition detection.
Figure 2:
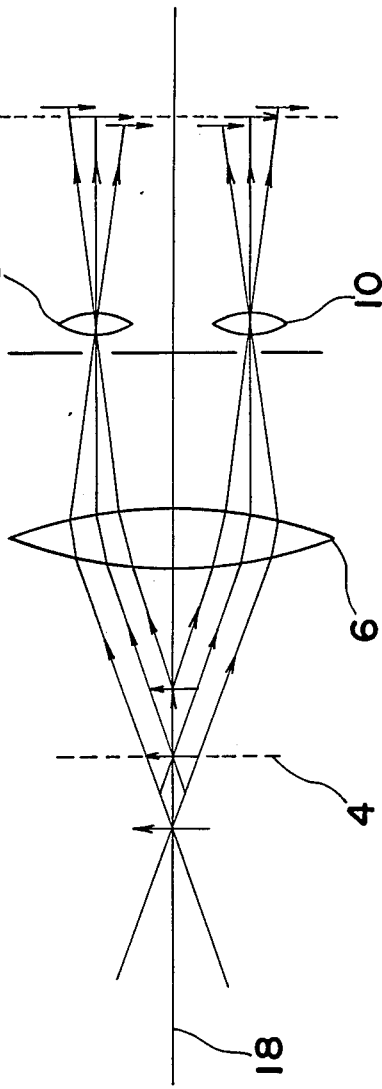
FIG. 2 is an enlarged partical view of FIG. 1 for showing a principle of the focus detection.
Figure 3:
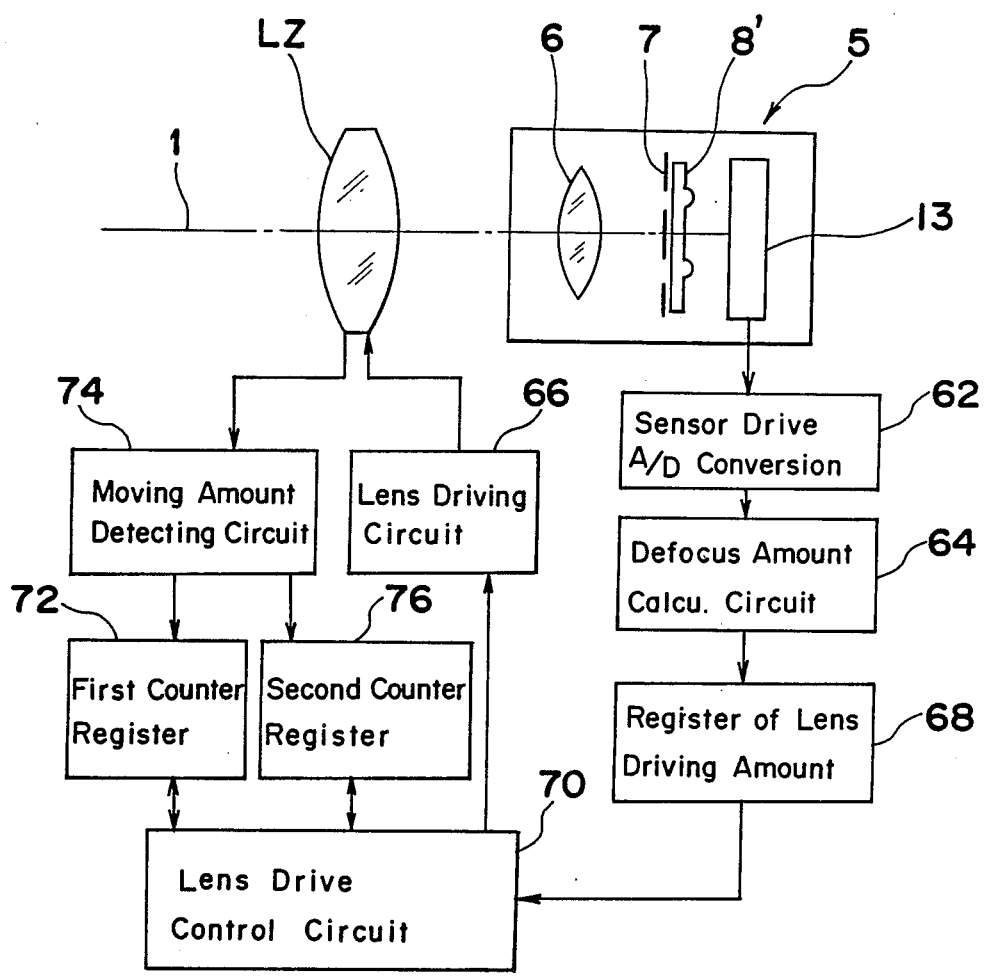
FIG. 3 is a block diagram showing composition of the present invention.

FIG. 3 shows a block-diagram of the automatic focus adjusting device according to the present invention.

A defocus amount calculation circuit 64, a register of lens driving amount 68, a control circuit for lens drive 70, a first counter register 72 and a second counter register 74 are defined in the micro-computer.

Light from an object having passed through objective lens LZ is introduced into a focus condition detecting module 5 installed in the main body BD. The focus condition detecting module 5 includes a condenser lens 6, an aperture mask 7, a reimaging lens 8' and a CCD image sensor 13.

The light intensity of an object image being incident into the CCD image sensor 13 is transferred into photoelectric current data and the data is read, via an A/D conventer 62, by the defocus amount calculation circuit 64. The defocus amount calculation circuit 64 calculates a defocus amount DF (deviation from an in-focus position) as will be explained in detail in section (C).

In the lens driving system, an automatic focus adjusting operation is carried out by driving the objective lens LZ by a driving amount (a countnumber of pulses) corresponding the defocus amount DF with use of the motor MO1. Lens driving circuit 66 controls the objective lens LZ so as to drive it with two different speed. In a zone wherein the defocus amount DF is large (hereinafter referred to "out zone"), the objective lens LZ, the lens driving circuit 66 drives the objective lens at a high and constant speed and, in a zone wherein the defocus amount DF is small (hereinafter referred to "near zone"), at a low speed or at a changing speed by a duty control of the motor MO1.

In the out-zone, the focus condition detecting operations are repeated while moving the objective lens at a constant speed. This enables to calculate the lens driving amount (ERRCNT) following a movement of an object acccurately. A forecast count number from the start of deceleration of the objective lens till the lens stop, namely maximum number forecasted with respect to individual interchangeable objective lens, as will be explained later, is subtracted from the lens driving amount (ERRCNT).

On the contrary to the above, the focus condition detecting operation with the lens being driven is not executed in the near zone, and the objective lens is stopped when it has been driven by a remaining lens driving amount.

The register 68 of lens driving amount stores a lens driving amount converted from the detected defocus amount as a count number of pulses to be detected at a movement amount detection circuit 74. The movement amount detection circuit 74 is comprised of an encoder including a photo-interrupter and a code plate mounted on the driving shaft of the motor MO1. When the objective lens is started to drive, the movement detection circuit 74 outputs pulse signals from the encoder to a first and second counter registers 72 and 76. When the detected defocus amount DF is in the out-zone, the register 68 stores a value EVTCNT subtracted from the lens driving amount ERRCNT by a predetermined pulse count number NZC defined as that necessary for driving the lens in the near zone and a forecast run over amount KNZ caused during the focus condition detecting operation (EVTCNT=ERRCNT−NZC−KNZ). And, the lens drive control circuit 70 outputs a high-speed driving signal to the lens driving circuit 66 and sets an amount EVTCNT to be driven at a high speed into the first counter register 72. The value KNZ is equal to zero when the focus condition detecting operation is carried out in the ceased state of the objective lens and is given as a predetermined constant when the focus condition detecting operation is carried out in the high and constant driving state of the objective lens.

In this preferred embodiment, a time necessary for correction calculation is shortened in order to increase a possible number of the focus condition detecting operation by correcting with only the constant value KNZ without performing a correction calculation for correcting the lens driving amount ERRCNT with a value corresponding to a time interval CTC needed for the focus condition detection calculation.

The number initially set in the first counter register 72 is renewed every focus condition detection. This value is decremented by one every time when a pulse is applied thereto from the movement amount detecting circuit 74. When the number is decremented to zero, since this means the completion of high speed driving, the first counter register 72 outputs an interruption signal to the lens drive control circuit 70 in order to initialize it for low-speed driving. Namely, in accordance with the interruption, the defocus amount calculation circuit 64 outputs a drive amount NZCNT (=NZC+KNZ) to the register 68 for the lens driving amount by which the objective lens is to be driven in the near zone. Also, the circuit 64 outputs a count value CTC indicating an amount of run over of the objective lens caused in the latest focus condition detection calculation as a count value ENZCNT (ENZCNT=CTC) to the second counter register 76. Namely, the measured value CTC is used in place of the forecast value KNZ. Then, the objective lens LZ enters into the near zone. At the same time, the register for monitoring the lens drive amount is switched from the first counter register 72 to the second one 76.

In the near zone, the second counter register 76 outputs an interruption signal to the lens drive control circuit 70 at every time when a pulse is applied thereto from the movement amount detection circuit 74 in order to obtain a lens movement amount in the near zone by incrementing the count number ENZCNT of the second counter register 76 by one.

It is desirable to slow down the driving speed of the motor MO1 as the objective lens approaches to the in-focus position. In the near zone, the value of CTC is not renewed since the driving speed is not constant. Accordingly, a remaining driving amount is equal to (NZC+KNZ−CTC). When the count number ENZCNT of the second counter register 76 coincides with the value NZCNT stored in the register of lens driving amount 68, the motor MO1 is stopped to position the objective lens at the in-focus position detected.

Figure 6:
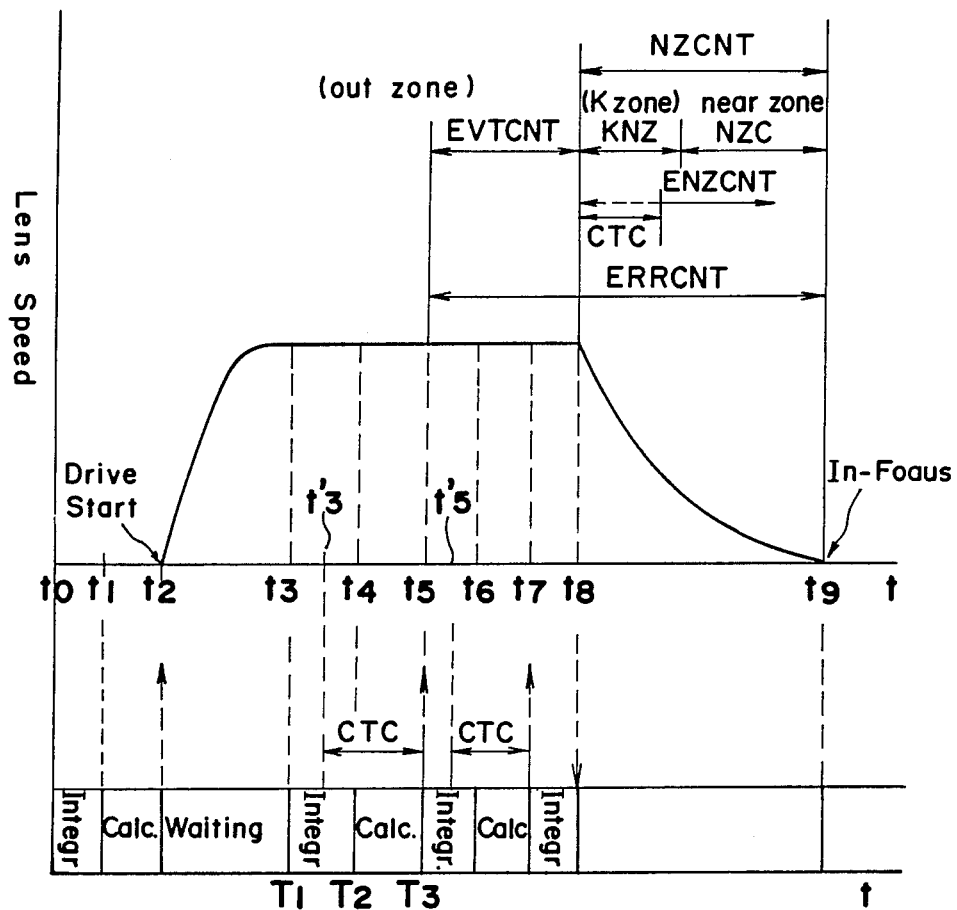
FIG. 6 is a time chart showing a driving mode of an objective lens.

FIG. 6 is a time-chart for showing the driving mode of the objective lens. When the start switch AFSW for the automatic focus adjustment is closed at a timing $t_0$, the integration operation by the CCD image sensor is started at the timing $t_0$ and the focus condition detection calculation is started at a timing $t_1$. When a defocus amount DF is obtained by the focus condition detection operation, the lens driving operation is started at a timing $t_2$. The integration by the CCD image sensor is suspended during the acceleration of the objective lens in order to avoid possible errors which may be caused thereby.

When the driving speed of the objective lens has attained to a constant speed, the integration by the CCD image sensor is started again at a timing $t_3$ while continuing the lens driving. The lens drive control circuit 70 reads the value stored in the first count register 72 at the timing $t_3$ and stores it in a first memory $T_1$ in order to calculate a count value corrsponding to an amount of over run of the objective lens which will be caused during the integration and the calculation. And, at a timing $t_4$ of the completion of the integration, a count value of the first counter register 72 is read out and stored in a second memory $T_2$. The calculation operation is started at the timing $t_4$ and completed at a timing $t_5$. At the timing $t_5$ of the completion of the calculation, the lens drive control curcuit 70 reads the value of the first counter register 72 to store it in a third memory $T_3$.

Assuming a representative point of the integration as a central timing $t'_3$ between the timing $t_3$ and the timing $t_4$ wherein data regarding to an object image is obtained, there is a time delay represented by CTC which is a time interval defined between the representative point $t'_3$ of the integration and the completion timing $t_5$ of the focus condition calculation. The value CTC is a pulse count value having been counted from the timing $t'_3$ to the timing $t_5$ and, therefore, can be calculated according to an equation $\{(T_1-T_3)-(T_1-T_2)/2\}$.

Since the objective lens LZ is moved even for the time delay, the defocus amount, namely the lens driving amount DF calculated during the lens driving is deviated therefrom by the amount of CTC. However, it takes a relatively long time to perform correction calculations for correcting such deviations as mentioned above especially in the case that the object is moving relative to the camera. In order to pursue the object faithfully, it is desirable to shorten a cycle time of the focus condition detection calculation.

Accordingly, the lens driving amount to be driven during the high speed driving is assumed to an amount ERRCNT−KNZ−NZC which is obtained by subtracting a constant KNZ and a predetermined constant NZC from the lens driving amount ERRCNT obtained at the timing $t_5$ without performing correction with CTC. Namely, ERRCNT−NZC−KNZ→EVTCNT.

The forecast amount KNZ of over run of the objective lens is determined taking into consideration about an over run which might be caused in the case that such as objective lens having a heavy load per pulse for the lens driving amount is used with such a brightness requiring the maximum integration time, in other words, in the case that an objective lens having a small transforming coefficient of a defocus amount DF to a pulse count ERRCNT of the lens driving is used.

Meanwhile, the amount NZC is defined as a pulse number for driving the objective lens in the near zone, namely at a low speed therein.

Next, the integration by the CCD image sensor is started at the timing $t_5$ and, at the same timing, a count number of the first counter register 72 is read into the memory $T_1$ of the lens drive control circuit 70. Also, a count number of the first counter register 72 is read into the second memory $T_2$ at a timing $t_6$ of the completion of the integration and, further, is read into the third memory $T_3$ at a timing $t_7$ of the completion of the focus condition calculation in order to calculate an actual lens driving amount EVTCNT according to the equation EVTCNT= ERRCNT−NZC−KNZ.

Next integration is started at a timing $t_7$. In this example, before this integration is completed, the value of EVTCNT becomes equal to zero and, therefore, the high speed driving is ceased at a timing $t_8$. At the timing $t_8$, an interruption is entered to start the control flow by the first counter register 72 and the lens driving is switched from the high speed driving to the low speed driving.

At the same time, the driving amount NZCNT of lens in the near zone is set into the register 68 for the lens driving amount which is equal to NZC+KNZ and the value of CTC at the timing $t_8$ (which is calculated based on memory data $T_1$, $T_2$, $T_3$ corresponding to timing $t_5$, $t_6$, $t_7$, respectivery) is set into the second counter register 76 as a base value (off-set value). Thus, the register for monitoring the lens driving amount is switched from the first counter register 72 to the second counter register 76. This second counter register 76, as mentioned above, counts up whenever a pulse is applied thereto from the driving amount detecting circuit 74 according to the movement of the objective lens LZ.

Further, a sum NZCNT of the driving amount NZC in the near zone and the forecast over-run value KNZ of the objective lens is set into the register 68 for the lens driving as an amount of the low-speed driving (namely, CTC→ENZCNT, NZC+KNZ→NZCNT).

In FIG. 6, there are shown relations among these variable. Defining X as a pulse number corresponding to the actual movement of the objective lens in the near zone, ENZCNT is defined as a sum of CTC and X (CTC+X→ENZCNT). The objective lens LZ is stopped when ENZCNT becomes equal to NZCNT set in the register 68 since this means that the objective lens has been moved by an amount of movement being determined for the objective lens to be moved in the near zone. Therefore, the objective lens is positioned at an in-focus position thereof.

Meanwhile, the over run amount CTC can be calculated repeatedly in order to utilize it when the objective lens enters into the near zone or can be calculated after the objective lens enters into the near zone.

Next, the case that the objective lens locates in the near zone at the start of automatic focus adjusting control will be explained.

In this case, a lens driving amount ERRCNT obtained based on the integration and the calculation is set into the register 68 for lens driving amount as NZCNT. Further, the count value EVTCNT of the first counter register 72 is set to "FF$_H$" and the count value ENZCNT of the second counter register 76 is set to "0" (namely, ERRCNT→NZCNT, FF$_H$→EVTCNT, 00$_H$→ENZCNT).

Then, the objective lens LZ is driven at a low speed. The second counter register 76 is incremented by one every when a pulse is applied thereto from the driving amount detection circuit 74. When the count value ENZCNT of the second counter register 76 becomes equal to NZCNT, the objective lens is stopped at an in-focus position thereof.

Further, the case wherein the objective lens LZ locates in K zone at the start of automatic focus adjustment will be explained. K zone is defined as a zone ranging between the out zone and the near zone. A value KNZ defining the K zone is determined as the largest and, therefore, worst value of over run of the objective lens being expected when it runs over from the center timing of the integration till the completion of the focus condition detection calculation.

In this case, the control is performed similarilly to the case of the out zone at first. But, KNZ and CTC are set equal to zero, repectively, since the objective lens is stopped. Accordingly, EVTCNT is set equal to ERRCNT−NZC. In the K zone, the objective lens is driven at a high speed in order to omit next integration and it is avoided to stop the objective lens in the K zone thereby. Therefore, the next integration is performed in the near zone to start the low speed control of the objective lens.

(c) Calculation of Defocus Amount

Figure 8:
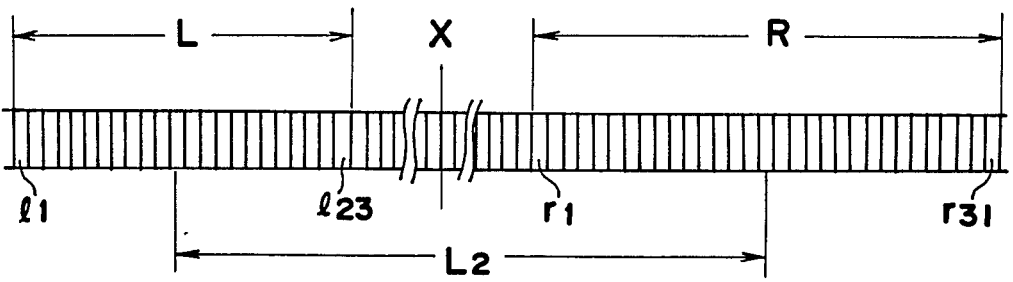
FIG. 8 is an enlarged plan view showing a composition of CCD image sensor.
Figure 7:
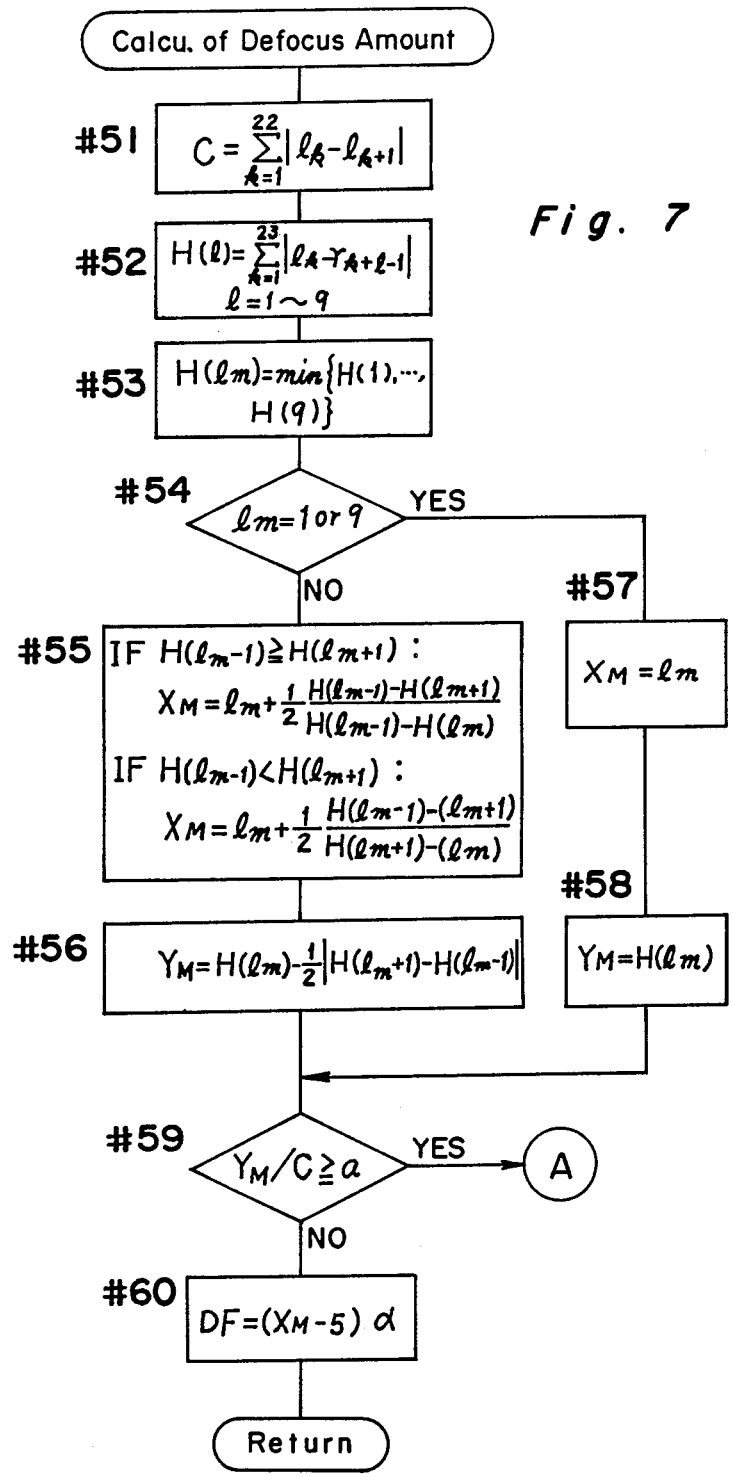
FIG. 7 is a flow chart of a program for calculating a defocus amount.

FIG. 7 shows a flow-chart of the program for calculating a defocus amount DF and FIG. 8 is a schematic plan view for showing the composition of CCD image sensor 13. As shown in FIG. 8, the CCD image sensor 13 is comprised of a linear CCD line sensor wherein pixels thereof are aligned linearly and has two detection portions arranged symmetrically with respect to the optical axis of the objective lens. One detection portion thereof is referred to "standard portion L" and the other is referred "reference portion R". Each light amount detected by each pixel of the standard portion L is indicated by $l_k$ wherein k is an integer among 1 to 23 and that detected by each pixel of the reference portion R is indicated by $r_k$ wherein k is an integer among 1 to 31.

In order to detect a distance of image between two images reimaged on the standard and reference portions L and R, respectively, the correlation calculation is carried out between the standard portion L and one of nine groups being defined on the reference portion R so as to have successive 23 pixels. Thus, nine correlation values H(l) (l=1, ... ,9) are obtained and a defocus amount DF is calculated based on the value of l which gives a minimum correlation value among nine correlation values H(l).

Now, referring to FIG. 7, at step #51, a value C of contrast is calculated according to an equation given in the box of step #51.

At next step #52, nine correlation values H(l) are calculated with respect to nine groups and at step #53, the value of l which gives the minimum correlation value is set to "lm".

At step #54, it is decided whether lm is equal to 1 or 9 and, if so, a position Xm of an object image is set to lm at step #57 and, further, the value of H(lm) is set as "$Y_M$" at step #58.

If it is decided that lm is not equal to 1 or 9, an interpotion calculation for determining the position $X_M$ of an object image accurately is executed at step #55 according to either of two equation as defined in the box thereof and, then, a value of $Y_M$ is calculated according to an equation defined in the box of step #56.

Next, it is decided at step #59 whether the value of ($Y_M$/C) is equal to or larger than a predetermined value "a". If so, the program returns without performing the calculation of defocus amount DF since the contrast is too low to correctly ensure the focus condition detection. If decided "NO", a defocus amount DF is calculated at step #60 according to an equation defined in the box thereof and, then, the program returns. In this case, the in-focus position is given by l=5 and "a" is a predetermined transforming coefficient.

(d) Flow-Chart of the Program for the Automatic Focus Adjustment

Figure 9A:
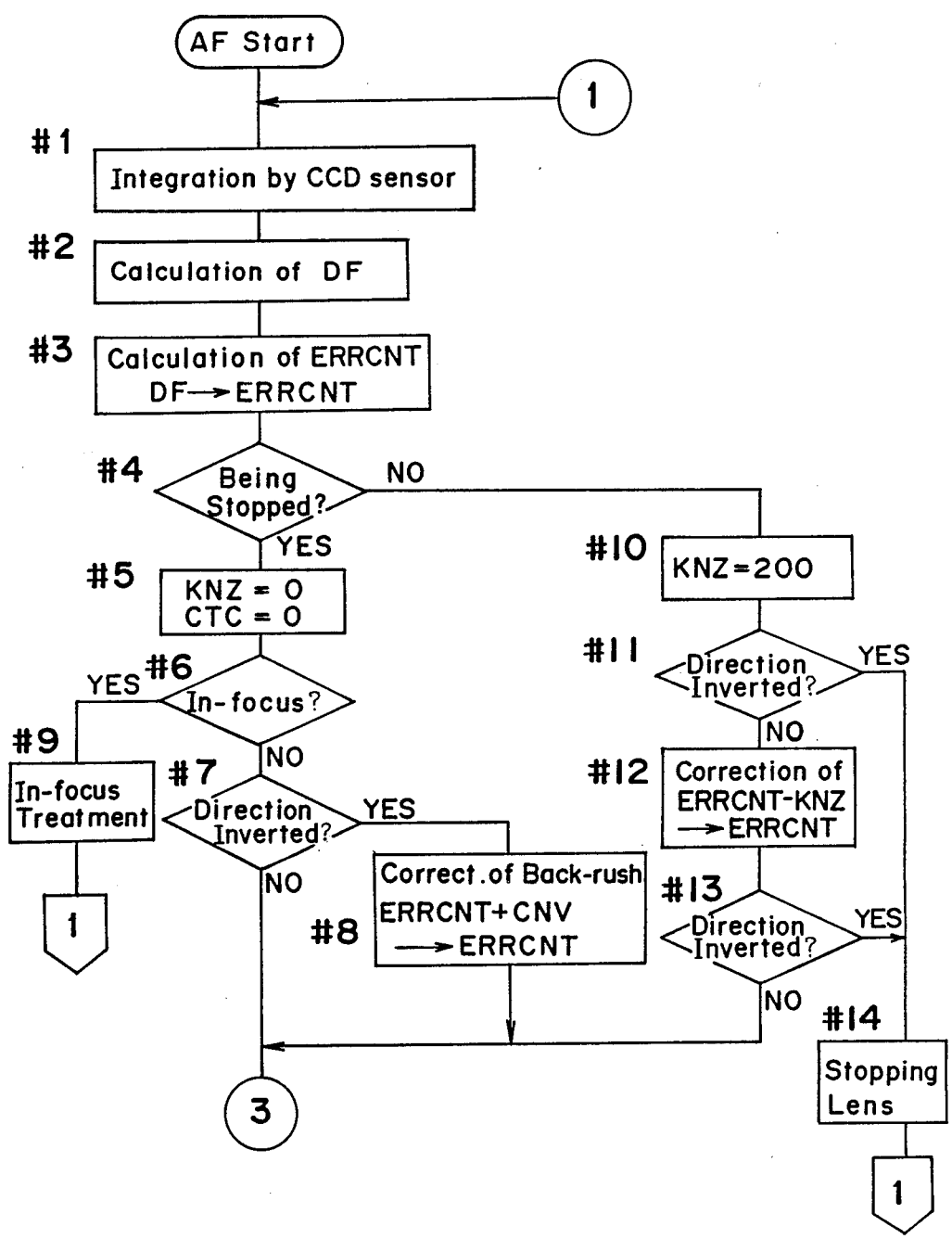
FIG. 9(a) and 9(b) are flow charts of a program for the automatic focus adjustment according to the present invention.
Figure 9B:
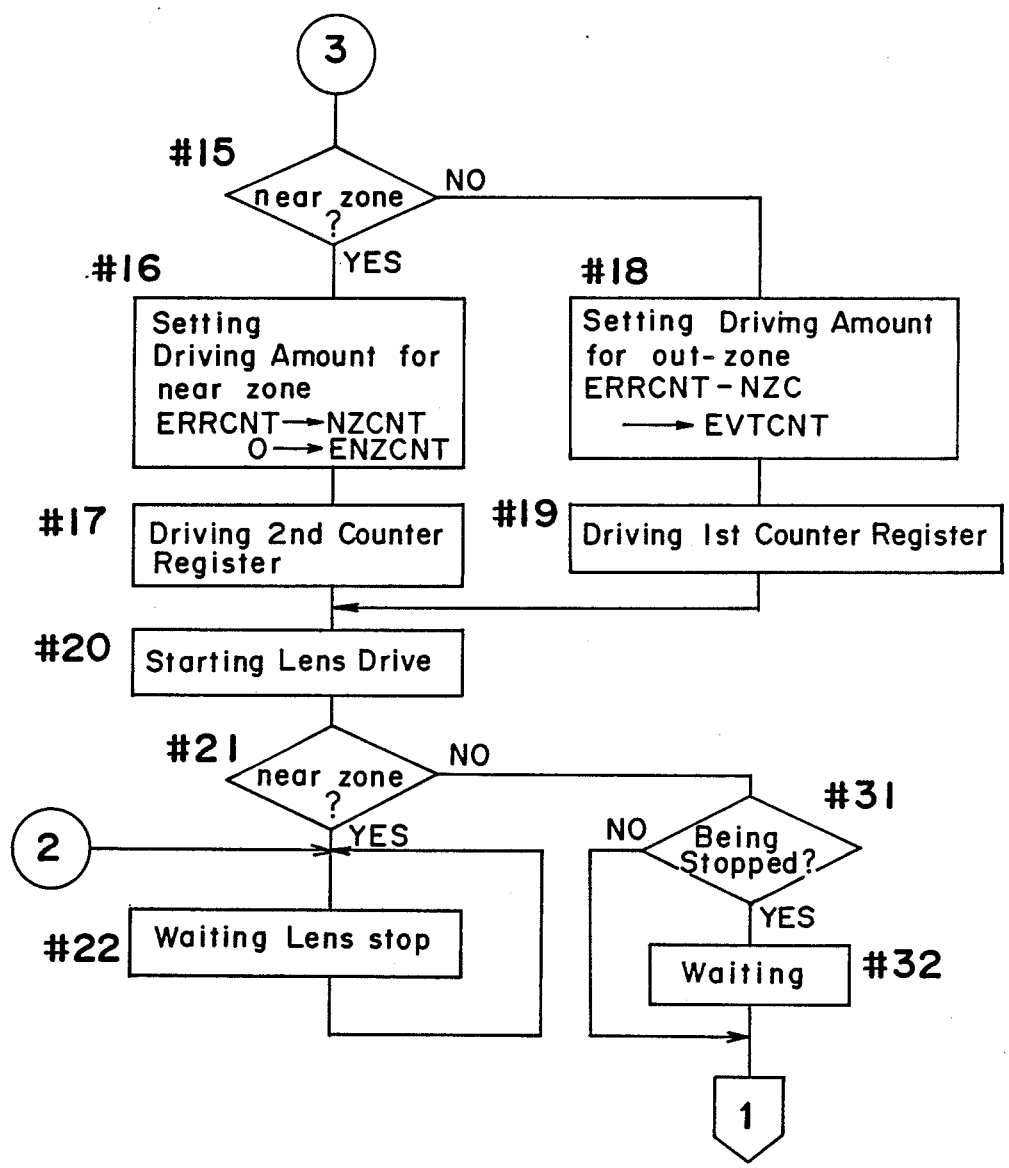

FIGS. 9(a) and 9(b) show a flow-chart of the program for automatic focus adjustment.

First assuming that an automatic focus adjustment is started when the objective lens locates in the out zone.

When the automatic focusing start switch AFSW is closed, the program is started and the CCD image sensor 13 is started to integrate charges corresponding to the light distribution of an object image at step #1. At step #2, a defocus amount DF is calculated based on image data obtained by CCD image sensor (refer to the abovementioned section (c)).

At step #3, a pulse count number ERRCNT for lens drive is calculated from the defocus amount DF with use of a lens driving amount transformation coefficient.

At step #4, it is decided whether the objective lens is stopping or not. Since the objective lens is stopping at first, the program proceeds to step #5. At step #5, a forecast value KNZ of over run of the objective lens is set to "0" since the objective lens is stopping, and, also, the value of CTC is set to "0".

It is decided at step #6 based on the defocus amount detected whether the objective lens is in-focus or not. If DF<ERRCNT, namely the objective lens is in-focus, the program proceeds to step #9 to display it. And, then, the program returns to step #1 to repeat the focus condition detection.

If the objective lens is out-of-focus, the program proceeds to step #7 in order to check whether the latest defocus direction is same to the preceding one or not. If the direction is inverted, the program proceeds to step #8 in order to perform a correction for correcting backrush of the driving mechanism for the objective lens.

Next, at step #15 of FIG. 9(b), it is decided whether the lens driving amount ERRCNT is within the near zone defined by the value of NZC or not, namely whether ERRCNT is smaller than NZC or not. If it is within the near zone, the program proceeds to step #16 after setting a near zone flag to "High".

If "NO", the program proceeds to step #18 to set out-zone driving amount ERRCNT-NZC into the register 68 for lens driving amount as EVTCNT.

At step #19, the lens drive control circuit 70 drives the first counter register 72 to output a high-speed driving signal to the lens driving circuit 66 and the program proceeds to step #20. At step #20, the lens driving circuit 66 starts to drive the objective lens LZ at the high speed.

At step #21, it is checked again whether the objective lens is in the near zone or not. This check is done by referring the near zone flag. If the near zone flag is set, the program proceeds to step #22 in order to wait for the stop of the objective lens. If it is not set, the program proceeds to step #31 in order to check whether the objective lens is stopped or not. If it is stopped, the program proceeds to step #32 in order to wait until the speed of the object lens attains to a constant speed. Similarly to the step #22, this is done to avoid errors in the focus condition detection induced by the acceleration of objective lens. However, it is to be noted that the waiting in the near zone at step #22 is necessary for avoiding errors induced during the lens driving since the objective lens is decelerated immediately after the acceleration thereof. This stop operation is done by an interruption process by the second counter register 76.

When the objective lens locates in the out zone as mentioned above, the program proceeds from step #31 to step #1 of FIG. (9a), the timing of return corresponding to the timing $t_3$ of FIG. 6. Thus, at step #1, new integration is started and the program proceeds to step #4 after executing steps #2 and #3. At this time, the program proceeds from step #4 to step #10 since the objective lens is being driven now.

At step #10, pulse number of two hundreds is set as the count value KNZ of over run of the objective lens. Then, it is checked at step #11 whether the defocus direction is inverted or not.

If inverted, the program proceeds to step #14 in order to stop the objective lens and, again, starts next focus condition detection.

If not inverted, the driving amount ERRCNT is corrected by a forecast amount KNZ of over run at step #12. Then, it is checked again at step #13 whether the defocus direction obtained after the correction at step #12 is inverted or not. If the defocus direction is inverted, the program proceeds to step #14 in order to stop the objective lens.

If not inverted, the program proceeds to step #15 of FIG. 9(b). When the objective lens is still in the out zone, the program proceeds to step #18 to set a driving amount in the out zone EVTCNT as a difference subtracted from the value of ERRCNT by the value of KNZ. Namely, the driving amount EVTCNT is set to ERRCNT−KNZ−NZC during the drive of objective lens. The program proceeds to step #31 through steps #19, #20 and #21. In this stage, since the objective lens is being driven, the program returns to step #1 in order for the next focus condition detection without waiting.

Figure 10:
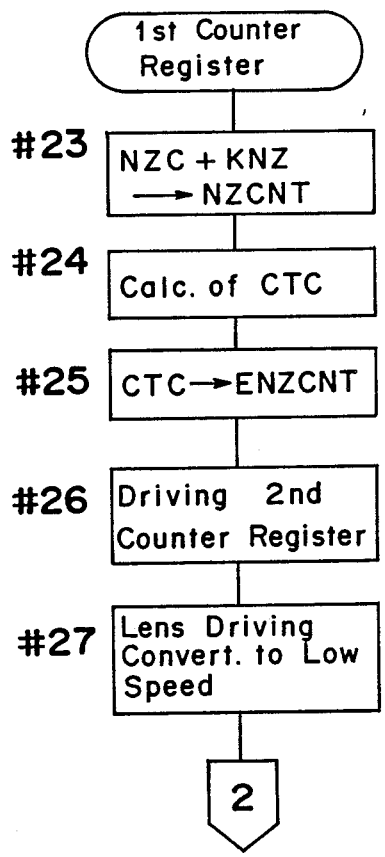
FIG. 10 is a flow chart of an interruption program for switching the driving mode from the high speed drive to the low speed drive.

If the objective lens has been driven by the lens driving amount EVTCNT in the out zone, namely the count value of EVTCNT has become zero during the focus condition detecting operation (steps from #1 to #3), an interruption routine as shown in FIG. 10 is started by an interruption signal outputted from the first counter register 72. This interruption routine is provided for switching the driving mode from the high speed driving to the low speed driving. Namely, the driving amount NZCNT for driving the objective lens in the near zone is set into the register 68 for the lens driving amount at step #23. At step #24, the value of CTC is calculated based on data obtained from the center point of the integration to the completion of the calculation during the preceding focus detection operation having done just before the switching to the low speed driving. And, at step #25, the value of CTC thus obtained is set into the counter 76 for monitoring the driving amount as an initial ENZCNT.

Then, the second counter register 76 is started to operate at step #27 and, at step #27, the lens driving circuit 66 is switched into the low speed driving mode and, the program is proceeded to step #22 of FIG. 9(b) for waiting the stop of the objective lens.

Figure 11:
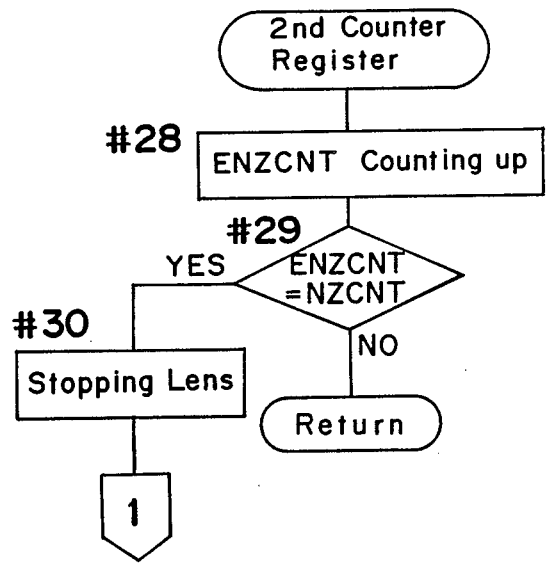
FIG. 11 is a flow chart of an interruption program for the low speed drive mode.

During the low speed driving, an interruption routine as shown in FIG. 11 is executed every time when a pulse is outputted by the movement amount detection circuit 74. This interruption routine is provided for detecting the movement amount of the objective lens. At step #28, the second counter register 76 counts up the count number ENZCNT thereof by one. The count number thereof just after switching to the low speed driving is set to CTC as mentioned above. At step #29, the count number ENZCNT is compared with the driving amount NZCNT. If the count number ENZCNT is not attained to the value NZCNT, the program returns to step #22 and waits the next interruption.

When the count number ENZCNT becomes equal to the value NZCNT, the objective lens is stopped at step #30 and the program returns to step #1 in order to start the next focus condition detection to confirm that the objective lens locates at an in-focus position. Then, if it is confirmed by this focus condition detection that the focus condition is in-focus, the program proceeds to step #9 for the infocus treatment, e.g, displaying "in-focus state".

Next, the case in that the objective lens locates in the near zone at the start of automatic focus condition detection will be explained.

The program proceeds from step #1 to step #15 similarly to the case of the out zone. At step #15, it is decided that the objective lens is within the near zone in this case, the program proceeds to step #16. At step #16, the driving amount ERRCNT in the near zone is set as the value of NZCNT and the value of the second counter register 76 is set to zero. Thus, the second counter register 76 is started to drive at step #17 and, then, the objective lens is started to drive at step #20.

When it is decided at step #21 that the objective lens is in the near zone, the program proceeds to step #22 to wait for the stop of the objective lens. Similarilly to the case after switching the driving mode to the low-speed driving, every time when a pulse is outputted from the movement amount detection circuit 74, the interruption routine by th second counter register 76 is executed and, when the objective lens has been moved to an in-focus position thereof, the objective lens is stopped and "In-focus" is displayed at step #9.

Next, the case wherein the objective lens is in the K zone at the start of automatic focus condition detection operation will be explained.

The program proceeds from step #1 to step #15 similarilly to the cases above mentioned. However, it is to be noted that the value EVTCNT is set as the driving amount in the out zone at step #18 (ERRCNT−NZC→EVTCNT). And, at step #20, the objective lens is started to drive and, the program proceeds from step #21 to step #32 and returns to step #1.

However, in the case of the K zone, there can be such an occasion that the objective lens has been moved by the driving amount in the out zone before the completion of the next loop of the focus adjusting operation (steps #1 to #4 →#10 to #13→#15) since the value KNZ is set to the pulse number of 200 at most. In this occasion, the interruption routine by the first counter register 72 is executed with use of the lens driving amount ERRCNT obtained during the stop of the objective lens. The lens driving amount ERRCNT which invites the interruption of FIG. 10 is not related to the over run CTC since the objective lens is stopped. Accordingly, the value of KNZ and CTC are set equal to zero at step #5, respectively. Therefore, in the interruption routine of FIG. 10, the value KNZ at step #23 is equal to zero, and the value CTC at steps #24, #25 becomes equal to zero. Accordingly, the value NZCNT is set to NZC and the value ENZCNT is set to zero.

Then, the program proceeds from step #27 to step #22 and the interruption by the second counter register 76 is repeated untill ENZCNT becomes equal to NZCNT.

Although we have fully described embodiment of the present invention, various modification and variations which might be obvious to those skilled in the art can be made.

For example, the calculation of CTC at step #24 of FIG. 10 can be inserted between step #11 and step #12. In this case, the calculation of CTC is performed during the high speed driving. Accordingly, it becomes unneccessary to store $T_1$, $T_2$ and $T_3$ until the interruption by the first counter register. Therefore, only a register for storing CTC is provided in this case.

Further, the first and second counter registers 72 and 76 can be substituted by one common register. Since the first and second counter registers are not used at the same time as apparent from the mentioned above, the common register can be used as the first counter register at first and, then, switched to the second counter register.

Also, the first counter register can be a count-up register similar to the second counter register. In this case, the initial value of first counter register is set equal to zero and the count number thereof is incremented by one every time when a pulse is input thereto. When the first register counter counts up to the same value stored in the register for lens driving amount, the high speed driving is stopped.

What is claimed is:

1. An automatic focus adjusting device comprising:
an objective lens;
photo-receiving means of a charge integration type for receiving light from an object that has passed through the objective lens and outputting integrated charges;
focus condition detecting means for detecting a defocus amount of the objective lens from an in-focus position thereof on the basis of the outputs of the photo-receiving means;
lens driving amount calculating means for calculating the amount of movement of the objective lens to the in-focus position on the basis of the defocus amount detected by the focus condition detecting means;
lens driving means for driving the objective lens to the in-focus position in accordance with the amount of movement calculated by the lens driving amount calculating means;
lens driven amount detecting means for detecting the amount of movement driven by the lens driving means; and
control means for controlling the photo-receiving means, the focus condition detecting means, the lens driving amount calculating means, and the lens driving means,
so that the lens driving means drives the objective lens at a high speed while the photo-receiving means, the focus condition detecting means, and the lens driving amount calculating means are operated when the amount of movement calculated by the lens driving amount calculating means is out of a predetermined range,
and that the lens driving means drives the objective lens at a lower speed when the amount of movement calculated by the lens driving amount calculating means falls in the predetermined range,
and further that the operation of the lens driving means is stopped when an amount of movement detected by the lens driven amount detecting means, summed with an amount of any movement which has been detected by the lens driven amount detecting means just before the amount of movement falls in the predetermined range during a time period from a specific timing of the integration by the photo-receiving means to a completion timing of the focus condition detecting operation by the focus condition detecting means, corresponds to the amount of movement of the objective lens to the in-focus position calculated by the lens driving amount calculating means.

2. An automatic focus adjusting device according to claim 1, wherein said predetermined range is determined in accordance with the sum of a maximum amount of movement required for stoppage of the lens and an amount of movement estimated for movement of the objective lens during a time period from the specific timing of the integration by the photo-receiving means to the completion of calculation of the amount of movement of the objective lens by the lens driving amount calculating means.

3. An automatic focus adjusting device according to claim 1, in which the lens driven amount detecting means includes movement signal generating means for generating a movement signal at every timing that the objective lens has been driven by a predetermined value and count means for counting movement signals generated by the movement signal generating means.

4. An automatic focus adjusting device according to claim 3, in which the lens driving amount calculating means calculates an amount of movement of the objective lens based on a first count number outputted by the count means at the starting timing of the integration operation, a second count number at the completion timing of the integration operation and a third count number at the completion timing of the focus condition detection operation by the focus condition detecting means.

5. An automatic focus adjusting device according to claim 3, in which the control means stops the lens driving by the lens driving means when the output of the count means coincides with a remaining driving amount to bring the lens to the in-focus position.

6. An automatic focus adjusting device according to claim 1, in which the control means includes speed switching means for switching the drive speed of the objective lens by the lens driving means according to whether the amount of movement falls in the predetermined range and the lens driving amount calculating means calculates an amount of movement of the objective lens just before the switching timing from the high speed to the low speed.

7. An automatic focus adjusting device comprising
an objective lens;
optical means for forming a first and second object images in such a manner that relative distance between two object image is varied according to a focus condition of the objective lens;
first and second image sensors of charge integration type for receiving two object image formed by the optical means, respectively and outputting charges integrated;
integration time control means for controlling charge integration time for the first and second image sensors according to the intensity distribution of two object images;
focus condition detecting means for detecting a defocus amount of the objective lens from an in-focus position thereof based on the outputs of the first and second image sensors;
focus condition detection control means for controlling the integration operation of the first and second image sensors and the detection operation of the focus condition detecting means so as to repeat these operations successively;
lens drive means for driving the objective lens to an in-focus position;
movement detecting means for detecting an amount of movement of the objective lens driven by the lens drive means;
movement calculation means for calculating an amount of movement of the objective lens from a specific timing during the integration by the first and second image sensors to a completion timing of the focus condition detecting operation according to the output of the movement detecting means while the integration operation by the first and second image sensor and the detecting operation by the focus condition detection means are repeated as driving the objective lens;
decision means for deciding whether the defocus amount detected falls within a predetermined range including an in-focus position or not; and
lens control means for controlling the lens drive means based on the output of the movement detecting means and the result of decision by the decision means, said control means repeating the integration operation by the first and second image sensors and the detection operation by the focus condition detection means while controlling the lens drive means so as to drive the objective lens at a high and constant speed when the defocus amount detected is out of the predetermined range, and controlling the lens drive means so as to drive the objective lens at a low speed when the defocus amount detected falls in the predetermined range and to stop it when a remaining driving amount determined by a difference between a necessary driving amount corresponding to a defocus amount detected and an amount of movement calculated by the movement calculation means comes into a predetermined relation with respect to a amount of movement detected by the movement detecting means.

8. An automatic focus adjusting device according to claim 7, wherein the specific timing from which the movement calculation means starts to calculate an amount of movement of the objective lens is chosen as a center timing from a starting timing of the integration to a completion timing thereof.

9. An automatic focus adjusting device according to claim 8, in which the movement detecting means includes movement signal generating means for generating a movement signal at every timing that the objective lens has been driven by a predetermined value and count means for counting movement signals generated by the movement signal generating means.

10. An automatic focus adjusting device according to claim 9, in which the movement calculation means calculates an amount of movement of the objective lens based on a first count number outputted by the count means at the starting timing of the integration operation, a second count number at the completion timing of the integration operation and a third count number at the completion timing of the focus condition detection operation by the focus condition detecting means.

11. An automatic focus adjusting device according to claim 9, in which the lens control means stops the lens driving when the output of the count means coincides with the remaining driving amount.

12. An automatic focus adjusting device according to claim 7, in which the lens control means includes speed switching means for switching the drive speed of the objective lens by the lens drive means according to the result of decision by the decision means and the movement calculation means calculates an amount of movement of the objective lens based on an output outputted by the movement detection means just before the switching timing from the high speed to the low speed.

13. An automatic focus adjusting device comprising
photo-electric converting means for sensing two images obtained by reimaging two light bundles from an object which have passed through first and second areas of an objective lens being symmetric with respect to the optical axis of the objective lens;
defocus amount calculation means for calculating a defocus amount of the objective lens from an in-focus position thereof based on a relative position between two object images detected by the photo-electric converting means,
drive means for driving the objective lens toward an in-focus position thereof according to a driving amount obtained by converting the defocus amount thereinto;

movement signal generating means for generating signals corresponding to the movement of the objective lens;

count means for counting up or down signals generated by the movement signal generating means according to a direction of movement of the objective lens; and lens control means for controlling the movement of objective lens by the drive means, wherein the lens control means, when the defocus amount detected is out of a predetermined range, controls the photoelectric converting means and the defocus amount calculation means so as to perform the integration by the former and the calculation by the latter repeatedly, controls the drive means so as to drive the objective lens at a high and constant speed and calculates an amount of movement of the objective lens from a center timing of the integration till a completion timing of the calculation by the defocus amount calculation means based on count numbers obtained at following three timings of a start timing of the integration by the photo-receiving means, a completion timing thereof and a completion timing of the calculation by the defocus amount calculation means and, when the defocus amount detected falls within the predetermined range, the lens control means controls the drive means so as to drive the objective lens at a low speed and to stop it when a remaining driving amount determined by a difference between the driving amount of the objective lens calculated with use of the defocus amount detected and the amount of movement of the objective lens becomes equal to a number of pulses detected by the movement signal generating means.

14. An automatic focus adjusting device comprising:
an objective lens, photo-receiving means for receiving light from an object that has passed through the objective lens, said photo-receiving means integrating charges corresponding to the received light and outputting the integration of the charges;

focus condition detecting means for detecting a defocus amount of the objective lens from an in-focus position for the objective lens, the defocus amount corresponding to the output of the photo-receiving means;

lens driving amount calculating means for calculating the amount of movement of the objective lens required to bring the objective lens to the in-focus position, the amount of movement required to bring the objective lens to the in-focus position corresponding to the defocus amount detected by the focus condition detecting means;

lens driving means for driving the objective lens to the in-focus position;

lens driven amount detecting means for detecting the amount of driving movement provided by the lens driving means; and control means for controlling the photo-receiving means, the focus condition detecting means, the lens driving amount calculating means, and the lens driving means, such that (a) said lens driving means is controlled to drive the objective lens at a high speed when the amount of movement calculated by the lens driving amount calculating means to bring the objective lens to the in-focus position lies outside of a predetermined range, with the photo-receiving means, the focus condition detecting means, and the lens driving amount calculating means being operational during the time the objective lens is driven at the high speed, (b) the lens driving means drives the objective lens at a lower speed when the amount of movement calculated by the lens driving amount calculating means to bring the objective lens to the in-focus position is within the predetermined range, and (c) the lens driving means stops driving the objective lens when the sum of the amount of movement that has been detected by the lens driven amount detecting means when the objective lens is driven at a lower speed and the amount of movement which has been detected by the lens driven amount detecting means when the objective lens has been driven at the high speed corresponds to the amount of the movement of the objective lens to the in-focus position calculated by the lens driving amount calculating means, with the amount of movement of the objective lens required to bring the objective lens to the in-focus position being determined during a time period from a specific timing of the integration by the photo-receiving means to a completion timing of the focus condition detection operation by the focus condition detecting means.

15. A method for automatically focussing an objective lens in a camera comprising the steps of:

receiving light from an object that has passed through the objective lens on a photo-receiving means and outputting an integration of the charges corresponding to the received light;

detecting a defocus amount of the objective lens from an in-focus position on the basis of the output from the photo-receiving means;

calculating the amount of movement of the objective lens required to bring the objective lens to the in-focus position corresponding to the detected defocus amount;

driving the objective lens at a high speed when the calculated amount of movement required to bring the lens to the in-focus position is outside of a predetermined range, with the detection of the defocus amount of the objective lens from the in-focus position and the calculation of the amount of movement required to bring the objective lens to the in-focus position being performed during the time the objective lens is driven at the high speed, driving the objective lens at a lower speed when the amount of movement calculated to bring the objective lens to the in-focus position is within the predetermined range, and stopping the driving of the objective lens, when the detected amount of movement of the objective lens when the lens is driven at the low speed, summed with an amount of any movement which has been detected when the lens has been driven at the high speed up to a time before the calculated amount of movement is within the predetermined range, corresponds to the amount of movement of the objective lens to bring the objective lens to the in-focus position which was calculated prior to the lens being driven at a lower speed.

* * * * *